March 21, 1933.   E. M. BEANBLOSSOM   1,902,114
FOLIAGE TRIMMER
Filed Jan. 19, 1932   4 Sheets-Sheet 1
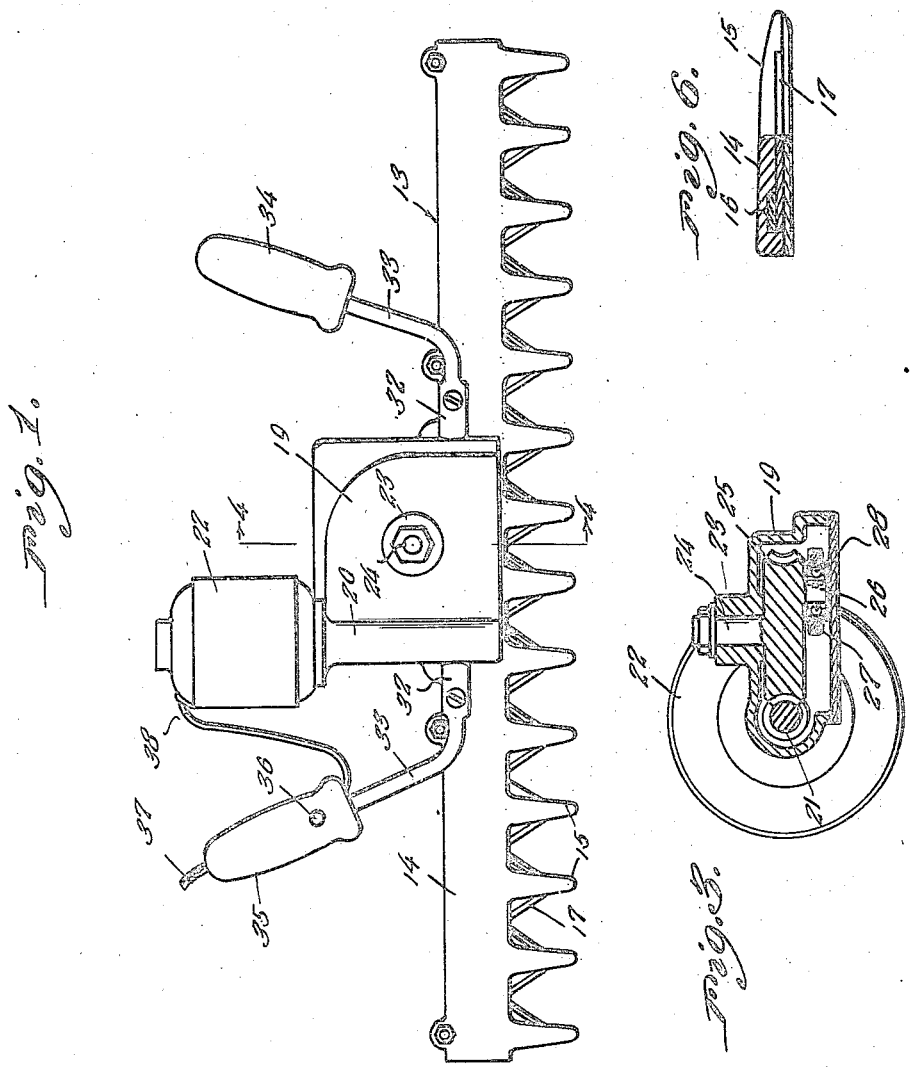
Inventor
Emmett M. Beanblossom,
By Clarence A. O'Brien
Attorney

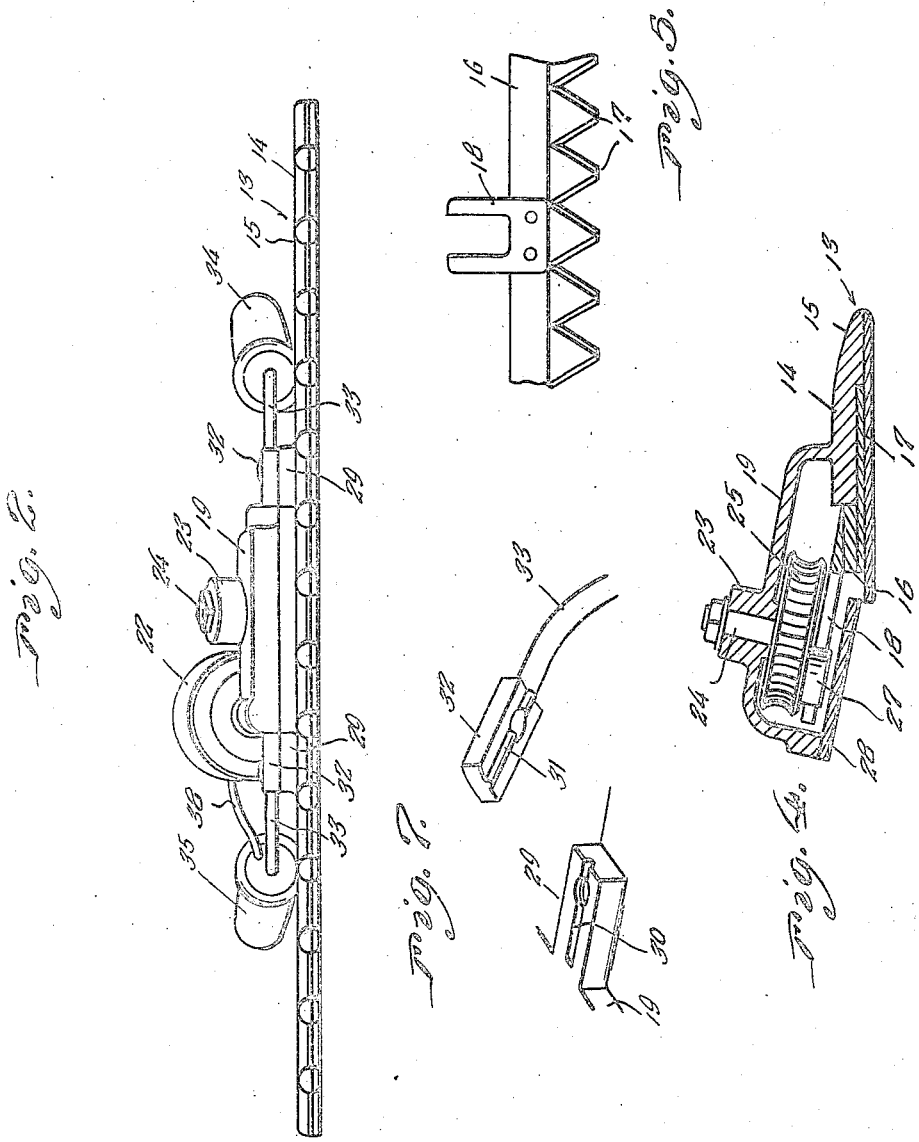

March 21, 1933. E. M. BEANBLOSSOM 1,902,114
FOLIAGE TRIMMER
Filed Jan. 19, 1932 4 Sheets-Sheet 3
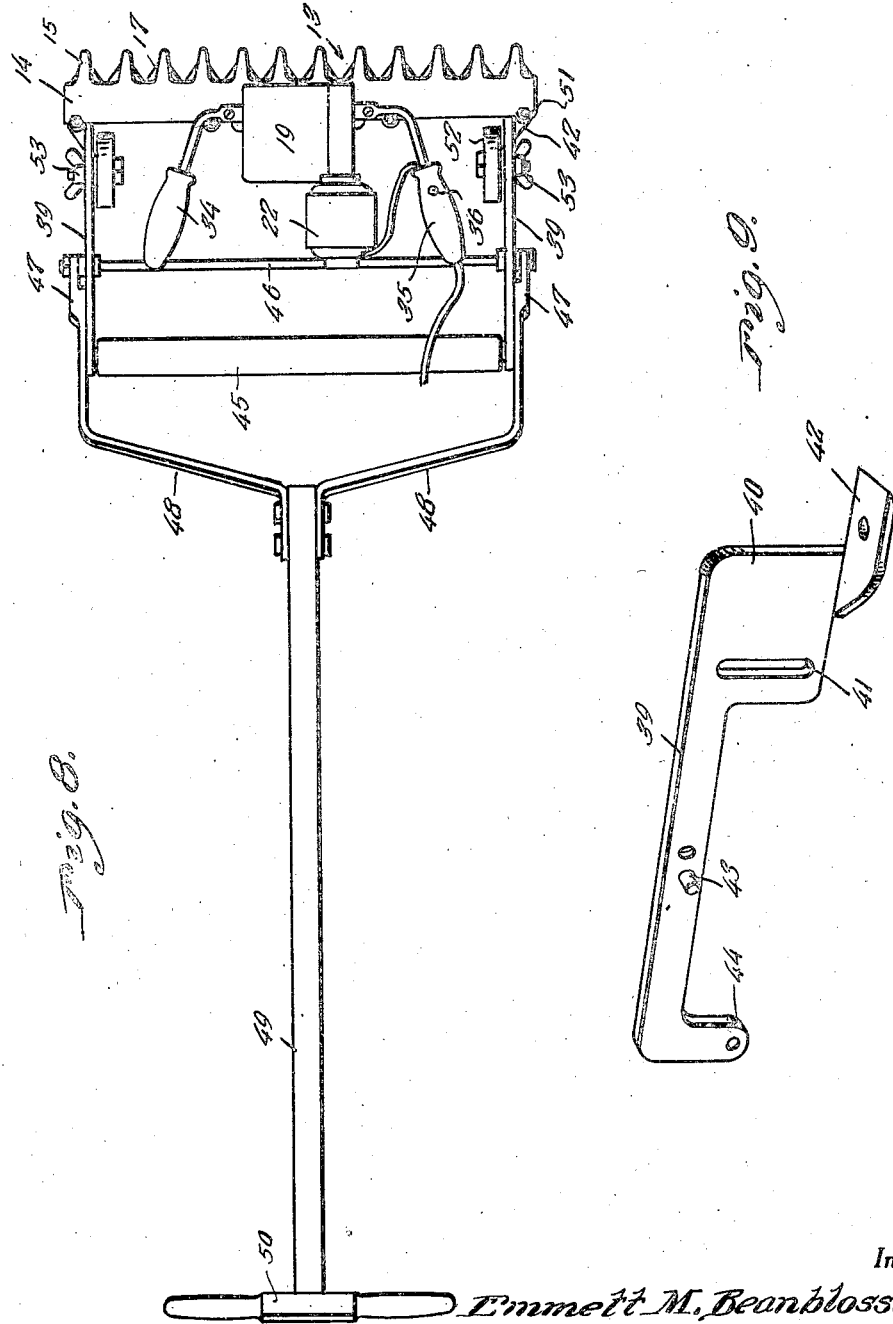
Inventor
*Emmett M. Beanblossom*,
By *Clarence A. O'Brien*
Attorney March 21, 1933.  E. M. BEANBLOSSOM  1,902,114
FOLIAGE TRIMMER
Filed Jan. 19, 1932  4 Sheets-Sheet 4
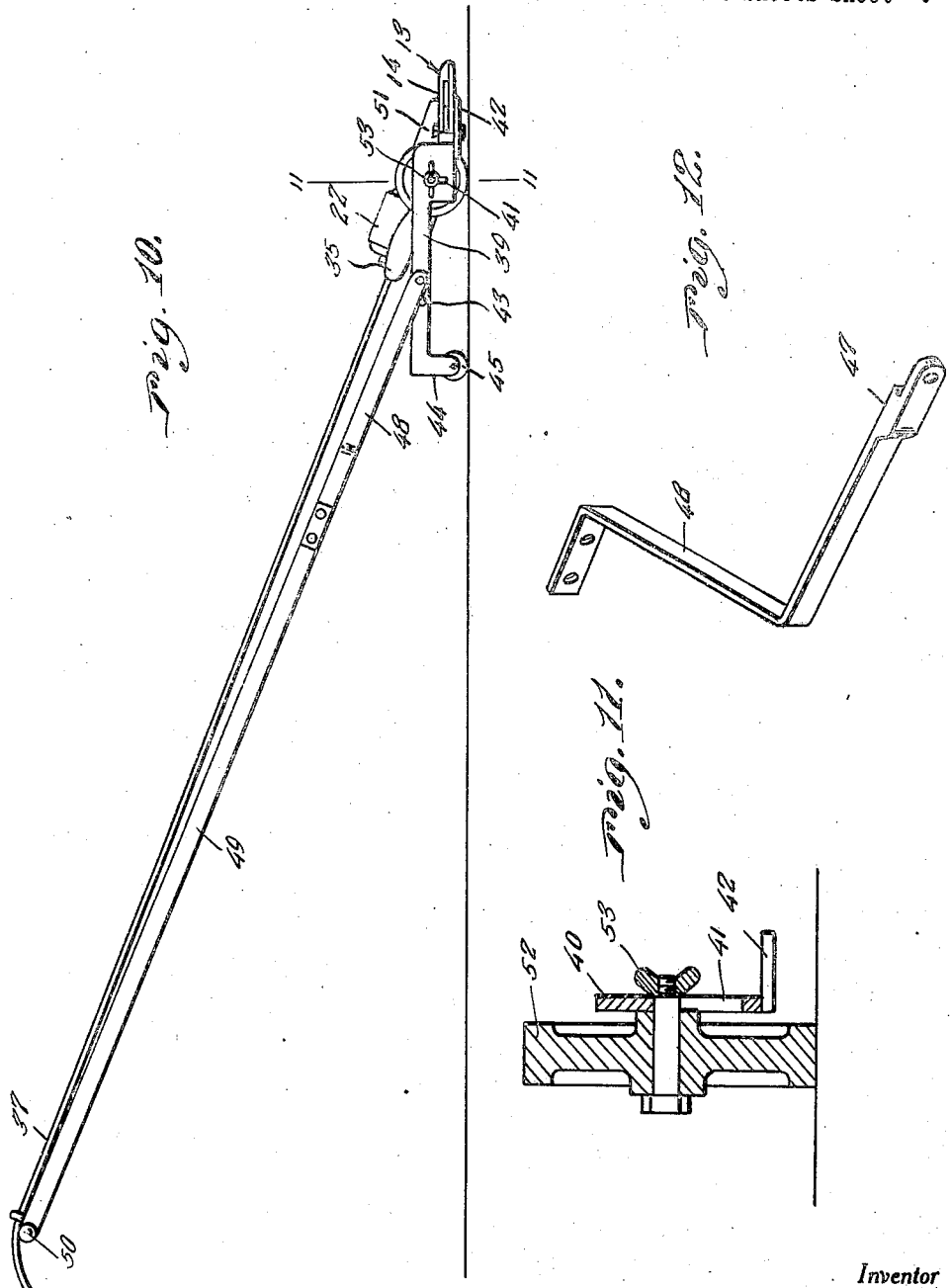
Inventor
Emmett M. Beanblossom,
By Clarence A. O'Brien
Attorney Patented Mar. 21, 1933

1,902,114

UNITED STATES PATENT OFFICE

EMMETT M. BEANBLOSSOM, OF CORYDON, INDIANA

FOLIAGE TRIMMER

Application filed January 19, 1932. Serial No. 587,557.

This invention relates to an improved foliage trimmer of a portable electric-motor equipped hand manipulated type provided with supplementary appurtenances permitting the device to be employed as a lawn edging and grass cutting machine.

Recited more explicitly, the inventive conception comprehends certain recognizable refinements and improvements embodied in a foliage and grass trimmer similar in some respects to the machine depicted in Patent 1,815,817 granted to L. D. Albertson, and partially assigned to me.

The present invention is characterized by a number of structural revisions all of which contribute their proportionate share to the production of a more successful and commercially practical trimmer of a unique convertible form calculated to better fulfill the requirements of a structure of this class.

Primarily, from a structural standpoint, the invention constitutes an improved head whose features are so constructed and arranged as to permit the structure, without alteration, to be converted into a grass cutter by attaching thereto a simple and economical carriage and handle structure.

Other features and advantages will become more readily apparent from the following description and drawings.

In the drawings:

Figure 1 is a top plan view of a hedge and foliage trimmer constructed in accordance with the present invention.

Figure 2 is a front edge elevation thereof.

Figure 3 is a cross sectional view through the gear casing.

Figure 4 is a transverse section on the line 4—4 of Figure 1.

Figure 5 is a fragmentary top plan view of the intermediate portion of the cutter bar.

Figure 6 is a transverse section through the cutter bar and guard assembly.

Figure 7 is a fragmentary perspective view showing one of the handle connections.

Figure 8 is a top plan view showing how the structure is converted to provide a grass cutter or lawn mower.

Figure 9 is a perspective view of one of the end members of the carriage frame.

Figure 10 is a side elevational view of the structure seen in Figure 8.

Figure 11 is a detail section on the line 11—11 of Figure 10.

Figure 12 is a perspective view of one of the sections of the handle attaching yoke.

Attention is first invited in particular to Figures 1 and 2, wherein the structural ensemble represents what may be referred to as the foliage trimmer or a hedge cutter as the case may be. The cutting means is designated as a unit by the numeral 13 and comprises a toothed cutter bar 14 whose teeth are represented at 15. The relatively reciprocatory cutter bar is denoted by the numeral 16 and as seen in Figure 5 is provided with cutting elements 17 co-operable with the teeth 15 in a well-known manner.

On the intermediate portion of the back of this cutter-bar is a U-shaped member 18 which constitutes an actuator for imparting the desired reciprocatory action to the cutter means.

Formed integral with the cutter guard 14 and attached to the intermediate portion thereof is a laterally directed substantially horizontal open-bottom gear casing 19, this constituting a housing for the limited movable U-shaped actuator 18, as seen in Figure 4. This casing is of the top plan configuration represented in Figure 1 having on one edge a tubular portion 20 to accommodate the worm screw 21 carried by the shaft of the electric motor 22. Incidentally it will be noted that the motor is in a substantially horizontal position.

The casing also includes upstanding tubular bearings 23 for the stub shaft 24 of a worm gear 25 in mesh with and operated by the screw 21. The gear 25 as seen in Figure 3 is provided with an eccentric stud 26 carrying an antifriction drive collar 27 located between the furcations or fingers of the U-shaped member 18 as seen in Figure 4. Incidentally the numeral 28 designates a cover plate for the open bottom of the mechanism casing.

Obviously then, when the motor is in operation, this gearing mechanism and operating connection between the parts 18 and 27 serves to reciprocate the cutter bar with respect to the guard 14. I call attention to the numeral 29 which designates the handle attaching extension on the gear casing, these extensions being apertured and formed with grooves 30. The grooves are adapted to receive retaining ribs 31 on the underside of attaching heads 32 carried by the handle shanks 33. There are two of these shanks as seen in Figure 1, the shank at the right being provided with a suitable handgrip 34 and the one at the left with a similar handgrip 35. The handgrip 35 is provided with a switch whose button is indicated at 36. This handgrip is also constructed to accommodate the power supply cable 37 which supplies current through the medium of the switch and subordinate conductor 38 to the motor 22. These handles are detachable but are generally left in position as seen in Figure 1 whether the device is used as a hedge trimmer or a lawn mower as seen in Figure 8.

Incidentally, when the trimmer is used as a lawn mower, it is bodily attached to a portable carriage and manipulating handle construction as shown in Figure 8.

Referring now to Figures 8 to 12 inclusive, I call attention to the fact that the carriage comprises a simple frame which includes a pair of spaced parallel end bars 39 (see Figure 9). Each bar has an enlarged portion 40 formed with a perpendicular slot 41 and an apertured attaching lug or ear 42. The intermediate portion of the bar is provided with a stop pin 43 while the opposite end is down-turned and apertured as indicated at 44 to accommodate a trunnion on the ground engaging roller 45, as seen in Figure 8.

Passing through apertures in the intermediate portions of the bars 39 is a tie rod 46 clamped or otherwise secured to the headed end 47 of the yoke section 48 carried by the handle bar 49. In practice, suitable handgripping means 50 is attached to the upper operating end of the handle bar 49. Thus by securing the lugs 42 to the end portions of the cutter guard by bolts and nuts 51 the hedge trimmer is temporarily converted into a grass cutter or trimmer capable of convenient edging work along pavements and around plants, trees and the like.

I desire to point out however that the frame is converted into a practical carriage by the incorporation therein of small rollers 52 secured by a bolt and nut 53 in the slot 41. Broadly then, the attachment for the structure seen in Figure 1 comprises a wheel and roller equipped carriage constructed to accommodate a pivotally attached yoke on the end of the handle bar 49 whereby to provide a portable conveyance for bodily attachment of the hedge trimmer to provide a convenient lawn mower.

It is thought from the foregoing description that the advantages and novel features of the invention will be readily apparent. It is to be understood that changes may be made in the construction and in the combination and arrangement of the several parts provided that such changes fall within the scope of the appended claims.

I claim:

1. A device of the class described comprising an elongated toothed cutter guard, a relatively movable cooperative cutter bar associated with said guard and provided with an actuator intermediate its ends, a casing connected directly to the guard and extending rearwardly therefrom and enclosing said actuator, gearing in said casing for operating the actuator, an electric motor carried by said casing for operating the gearing and supporting handles connected with the casing.

2. A device of the class described comprising an elongated toothed cutter guard, a relatively movable cooperative cutter bar associated with said guard and provided with an actuator intermediate its ends, a casing connected directly to the guard and extending rearwardly therefrom and enclosing said actuator, gearing in said casing for operating the actuator, an electric motor carried by said casing for operating the gearing and supporting handles connected with the casing, and means for detachably connecting the ends of the guard to the front portion of a carriage.

In testimony whereof I affix my signature.

EMMETT M. BEANBLOSSOM.